US008472345B2

(12) United States Patent
Xing

(10) Patent No.: US 8,472,345 B2
(45) Date of Patent: Jun. 25, 2013

(54) TERMINALS, SYSTEMS AND METHODS FOR TRANSMITTING CONTINUAL SERVICE MULTIPLEX CONFIGURATION INFORMATION

(75) Inventor: Xing Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 235 days.

(21) Appl. No.: 13/063,152

(22) PCT Filed: Nov. 27, 2009

(86) PCT No.: PCT/CN2009/075174
§ 371 (c)(1),
(2), (4) Date: Mar. 9, 2011

(87) PCT Pub. No.: WO2010/115333
PCT Pub. Date: Oct. 14, 2010

(65) Prior Publication Data
US 2011/0170454 A1     Jul. 14, 2011

(30) Foreign Application Priority Data

Apr. 7, 2009    (CN) .......................... 2009 1 0133906

(51) Int. Cl.
*H04L 12/28*      (2006.01)
(52) U.S. Cl.
USPC ...................................... 370/254; 375/240.25
(58) Field of Classification Search
USPC ...................................... 370/254; 375/240.25
See application file for complete search history.

(56) References Cited

U.S. PATENT DOCUMENTS

| 7,826,498 B2* | 11/2010 | Choi et al. | 370/535 |
| 2004/0237114 A1* | 11/2004 | Drazin | 725/105 |
| 2009/0028247 A1* | 1/2009 | Suh et al. | 375/240.25 |

FOREIGN PATENT DOCUMENTS

| CN | 101009553 A | 8/2007 |
| CN | 101335581 A | 12/2008 |
| CN | 101369859 A | 2/2009 |
| CN | 101442373 A | 5/2009 |
| CN | 101527836 A | 9/2009 |

OTHER PUBLICATIONS

International Search Report in international application No. PCT/CN2009/075174, mailed on Feb. 4, 2010.
English Translation of the Written Opinion of the International Search Authority in international application No. PCT/CN2009/075174, Feb. 4, 2010.
"Mobile Multimedia Broadcasting, Part 2: Multiplexing" published by Chinese State Administration of Radio, Film, and Television. http://www.sarft.gov.cn/. Feb. 2006. English Abstract included.

* cited by examiner

Primary Examiner — Wei Zhao
(74) Attorney, Agent, or Firm — Maier & Maier PLLC

(57) ABSTRACT

A method for sending, a method for receiving, a system for sending, and a terminal for receiving continual service multiplex configuration information. Wherein, a multiplex service server configures service information for each service according to multimedia broadcasting data of a mobile multimedia broadcasting service, encapsulates a service identifier of each service and the corresponding service information into the continual service multiplex configuration information, and sends the continual service multiplex configuration information to a terminal via a broadcasting network; wherein, the service information includes at least demodulation information and program information, and the program information is used to distinguish a type of each service. The methods, system and terminal can speed up processing for the mobile multimedia broadcasting service and improve the user experience, and even in the case of having not received ESG, the terminal can also acquire the necessary information for processing and playing the service data.

8 Claims, 4 Drawing Sheets

TERMINALS, SYSTEMS AND METHODS FOR TRANSMITTING CONTINUAL SERVICE MULTIPLEX CONFIGURATION INFORMATION

RELATED APPLICATIONS

This is the U.S. 371 national stage application which claims priority under 35 U.S.C. §371 to International Patent Application No.: PCT/CN2009/075174, filed Nov. 27, 2009, which claims priority under 35 U.S.C. §119, to Chinese Patent Application No.: 200910133906.X, filed Apr. 7, 2009, the disclosures of which are incorporated herein in their entireties.

TECHNICAL FIELD

The present invention relates to a mobile multimedia broadcasting system and a mobile TV terminal thereof, and particularly to a method for sending, a method for receiving, a system for sending, and a terminal for receiving continual service multiplex configuration information of a mobile multimedia broadcasting service.

BACKGROUND

An electronic service guide (ESG) of a China mobile multimedia broadcasting (CMMB) system is a multimedia broadcasting information navigation service. A terminal user can obtain related information of a multimedia broadcasting service through the ESG, e.g. a service name, playing time, a content outline, etc., so as to assist the user in quick searching, previewing and accessing. The ESG provides a good navigation mechanism for the users to watch a television program and enjoy information service, so that the users can find their favorite program and view the additional information of the program conveniently and quickly.

These functions of the ESG become an important approach and tool for the users to watch the programs. Various value-added services may be provided in the ESG, so as to generate a substantial income for an operator by making full use of ESG user group. As there are more and more ESG information, effectively organizing and scheduling the ESG information has become a more important task.

At present, many non-television services (e.g. stocks, information downloading, traffic navigations, etc.) have been added to a CMMB mobile TV service. These services are all integrated into an existing mobile TV module, and they are collectively referred to as a mobile multimedia broadcasting service, which are used to select and use a certain service among them after the user enters a mobile TV application. Currently, service identifiers of all the services of the mobile multimedia broadcasting service are all saved in a continual service multiplex configuration table (CMCT) of a control information table (borne in a multiplex frame 0) of a CMMB protocol architecture, as shown in FIG. 1a.

When the user watches the television, the terminal obtains the service identifiers of the program through the ESG, and obtains the demodulation information corresponding to the service, such as a Reed-Solomon (RS) code rate, a byte interleaved mode, a coding rate of a low density parity check (LDPC) code, a modulation mode, a timeslot quantity, and the number of timeslots, etc., according to the corresponding service identifiers in the CMCT, so as to obtain corresponding data from a demodulator to perform processing and playing.

Because the non-television services have just been added to a CMMB mobile TV, service identifiers of the non-television services are uncertain compared with the previous mobile TV service. Service identifiers of the non-television services, such as the stocks, the information downloading, the traffic navigations and so on, are verbally arranged between the terminal and a front-end transmission system. At present, it is verbally arranged that "2000" refers to the stocks and "2001" refers to the information downloading. However, there is no written agreement for specifying the service identifiers of the non-television services. The service identifiers, the service name and a program type (a television program, a broadcasting program, etc.) of the mobile multimedia broadcasting service are contained in the ESG. Not only reception demodulation parameters of all the previous mobile TV service but also the reception demodulation parameters of the new added non-television services (the stocks, etc.) are contained in the CMCT. However, there is no service type, service name and other information of a specific service in the CMCT. Therefore, complete mobile multimedia broadcasting service data can be obtained by using the ESG and the CMCT together.

Currently, an ESG transmission and reception system of a mobile multimedia broadcasting network is composed of three parts: an ESG server, a program source transmission subsystem and a terminal. The ESG server adds the ESG service to the program source transmission subsystem, the program source transmission subsystem transmits the ESG via a logic channel, and the terminal receives the ESG via the mobile multimedia broadcasting network.

If the terminal is able to receive the ESG, it needs to wait for downloading all the ESG data completely and to parse the ESG in order to acquire the service identifiers, the service type, an encryption indication and other information of the mobile multimedia broadcasting service therefrom, and thus to acquire the demodulation information of the service through the CMCT in order to obtain complete data and perform processing, so as to make presentation for the user finally.

To sum up, there are defects as follows in the existing technology.

(1) Each time the user enters the mobile TV application, it is required to execute ESG processing procedure (if there is local ESG, it is required to parse the ESG; and if there is no local ESG, it is required to parse it after downloading), thus the user needs to wait quite a long time, which has an influence on user experience.

(2) Because necessary information for parsing and playing the service data is contained in the ESG, the terminal has to combine it with CMCT information in order to parse and process the service data correctly. If the ESG server has not added the ESG service to the program source transmission subsystem, then it will cause that the ESG is not transmitted, or if the terminal has not received the ESG for some other reasons, then it will cause that the terminal cannot parse and process the service data.

SUMMARY

A technical problem to be solved by the present invention is to provide a method for sending, a method for receiving, a system for sending, and a terminal for receiving continual service multiplex configuration information, which can speed up the processing of a mobile multimedia broadcasting service to improve user experience. The terminal can also acquire necessary information for processing and playing service data even if it has not received an ESG.

To solve the above-mentioned technical problem, the present invention provides a method for sending continual service multiplex configuration information, which includes:

a multiplex service server configures service information for each service according to multimedia broadcasting data of a mobile multimedia broadcasting service, encapsulates a service identifier of each service and the corresponding service information into the continual service multiplex configuration information, and sends the continual service multiplex configuration information to a terminal via a broadcasting network; wherein the service information includes at least demodulation information and program information, and the program information is used to distinguish a type of each service.

Further, the multiplex service server may also send service data of each service to the terminal; wherein the service information may also include encryption information which is used to indicate decryption information for decrypting the encrypted service data of each service.

Further, the encryption information may include: an encryption indication which is used to indicate whether the service data are encrypted or not, and a key path which is used to decrypt the encrypted service data.

Further, the program information may include one or more of a service type, a service name and program classification information.

To solve the above-mentioned technical problem, the present invention provides a method for receiving continual service multiplex configuration information, which includes:

a terminal has received the continual service multiplex configuration information, and reads and parses service information according to a service identifier included in the continual service multiplex configuration information; wherein the service information includes at least demodulation information and program information; the demodulation information is used for the terminal to receive service data of each service, and the program information is used to distinguish a type of each service.

Further, the method may specifically include:

the terminal has received the continual service multiplex configuration information, reads the service identifier of each service, reads and parses the service information according to the service identifier, and saves it;

the terminal displays at least the program information to a user by taking the service identifier of each service as an index; and after the user selects a service, the terminal reads the corresponding service information according to the service identifier of the selected service, receives service data of the service according to the demodulation information included in the service information, and calls a corresponding service processing module according to the program information included in the service information, to process the service data.

Further, the program information may include one or more of a service type, a service name and program classification information.

Further, the service information may also include encryption information which is used to indicate decryption information for decrypting the encrypted service data of each service; and prior to processing for the service data, if the terminal determines the service data are encrypted according to the encryption information, then it decrypts the encrypted service data.

Further, the encryption information may include: an encryption indication which is used to indicate whether the service data are encrypted or not, and a key path which is used to decrypt the encrypted service data; and the terminal determines if the service data are encrypted according to the encryption indication, then it decrypts the service data according to the key path.

To solve the above-mentioned technical problem, the present invention provides a to system for sending continual service multiplex configuration information, which includes a mobile TV service server and a multiplex service server which are connected with each other, wherein the mobile TV service server is used to send multimedia broadcasting data of a mobile multimedia broadcasting service to the multiplex service server; and the multiplex service server is used to configure service information for each service according to the received multimedia broadcasting data, encapsulate a service identifier of each service and the corresponding service information into the continual service multiplex configuration information, and send the continual service multiplex configuration information to a terminal via a broadcasting network; wherein the service information includes at least demodulation information and program information, and the program information is used to distinguish a type of each service.

Further, the multiplex service server may also be used to send service data of each service to the terminal; and the service information may also include encryption information which is used to indicate decryption information for decrypting the encrypted service data of each service.

Further, the encryption information may include: an encryption indication which is used to indicate whether the service data are encrypted or not, and a key path which is used to decrypt the encrypted service data.

Further, the program information may include one or more of a service type, a service name and program classification information.

To solve the above-mentioned technical problem, the present invention provides a terminal for receiving continual service multiplex configuration information, which includes: a receiving module and a parsing and processing module which are connected in turn, wherein the receiving module is used to send the continual service multiplex configuration information received from a broadcasting network to the parsing and processing module; and the parsing and processing module is used to read and parse service information according to a service identifier included in the continual service multiplex configuration information; wherein the service information includes at least demodulation information and program information, the demodulation information is used for the terminal to receive service data of each service, and the program information is used for the terminal to distinguish a type of each service so as to call different service processing modules to perform processing.

Further, the parsing and processing module may also be connected with a displaying module and a mobile TV service processing module respectively, and wherein the receiving module may also be used to send all service data received from the broadcasting network to the parsing and processing module;

the parsing and processing module may also be used to save the corresponding service information and service data according to the service identifier of each service, and to send at least the program information of each service to the displaying module by taking the service identifier of each service as an index; and to read the corresponding demodulation information and the program information from the saved service information after receiving a certain service identifier sent from the displaying module, to read the corresponding service data according to the demodulation information, and to send the read service data together with the program information to the service processing module;

the displaying module may be used to display the program information to a user by taking the service identifier of each service as the index, and to send the service identifier of a service selected by the user to the parsing and processing module; and the service processing module may be used at least to perform corresponding service processing for the service data received from the parsing and processing module according to the received program information.

Further, the program information may include one or more of a service type, a service name and program classification information.

Further, the service information may also include encryption information; and a decrypting module may also be connected between the parsing and processing module and the service processing module, wherein after reading the corresponding service data according to the demodulation information, the parsing and processing module may also be used to determine the service data are encrypted according to the encryption information, and then to send the service data and the encryption information to the decrypting module, and to send only the program information to the service processing module;

the decrypting module may be used to decrypt the service data according to the encryption information, and then to send the decrypted service data to the mobile TV service processing module; and the service processing module may also be used to perform subsequent service processing for the decrypted service data received from the decrypting module according to the received program information.

Further, the encryption information may include an encryption indication and a key path; wherein the parsing and processing module may also be used to determine if the service data are encrypted according to the encryption indication, and then to send the service data and the key path to the decrypting module; and the decrypting module may also be used to decrypt the service data according to the key path, and to send the decrypted service data to the service processing module.

Being compared with the prior art, the program information and the encryption information is extended based on the basic information in the CMCT of the present invention, so that the terminal can quickly acquire the service type and an encryption attribute of the user's current favorite service with no need to wait for downloading and/or parsing the ESG, thus greatly reducing the user's waiting time of using the service and significantly improving the user experience. Moreover, even in the case of having not received the ESG for some reasons, the terminal can completely determine whether the current service is encrypted or not and which service type it belongs to by using the information in the CMCT, so as to ensure that the data of the current service are correctly processed and played for the user.

DETAILED DESCRIPTION

In order to solve defects in a conventional processing scheme for a mobile TV service, program information and encryption information of each service is extended based on the basic information in the CMCT of the present invention, so that when a user selects a service identifier of the current service, the terminal may quickly acquire a service type, an encryption attribute and service information corresponding to demodulation information through the CMCT according to the service identifier, and correctly parse and decrypt service data of the current service according to the service information to perform subsequent processing. According to the present invention, the terminal can quickly acquire the service type, the encryption attribute and other information of the user's current service with no need to wait for downloading and/or parsing ESG, thus speeding up the service processing and improving the user experience. Moreover, even in the case of having not received the ESG, the terminal can completely determine whether the current service is encrypted or not and which service type it belongs to, so as to ensure that the current service is played and used correctly.

Hereinafter, the technical schemes of the present invention will be described in details with reference to the drawings and preferred embodiments. The following embodiments are only used to describe and explain the present invention, and do not constitute any limitation to the present invention.

Because only the service identifiers and the demodulation information of each service are contained in the existing CMCT, the terminal cannot acquire the service type of the current service, i.e. a television program, a broadcasting program, stocks, information downloading, etc., and thus cannot perform parsing and processing for each service data. Furthermore, if the data of a certain service or certain services are encrypted, the terminal needs to call a decryption module to decrypt the data before calling a processing module for a respective service to perform processing. However, the encryption information is not contained in the existing CMCT, and has to be obtained through the ESG. If the terminal has not received the ESG, then it may make mistakes during calling a corresponding module to process the service even if it has acquired the service type, because a service processing module can only process free service data.

Figure 1A:
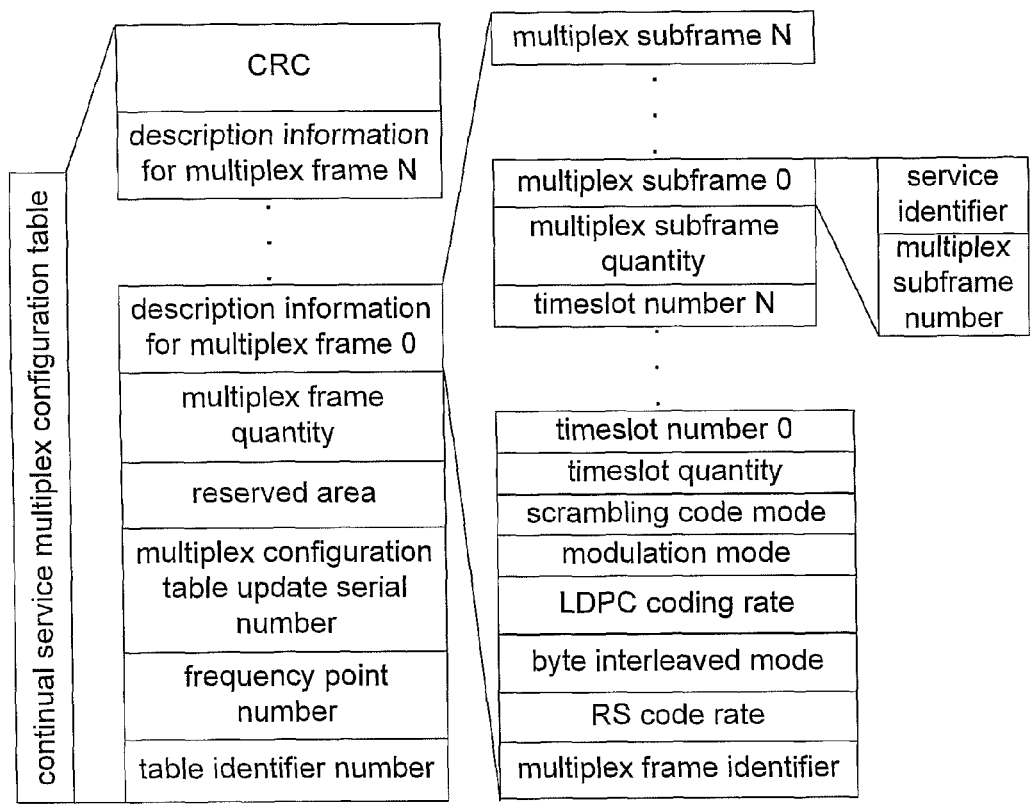
FIG. 1a is a schematic diagram illustrating a CMCT structure in an existing CMMB protocol architecture.
Figure 1B:
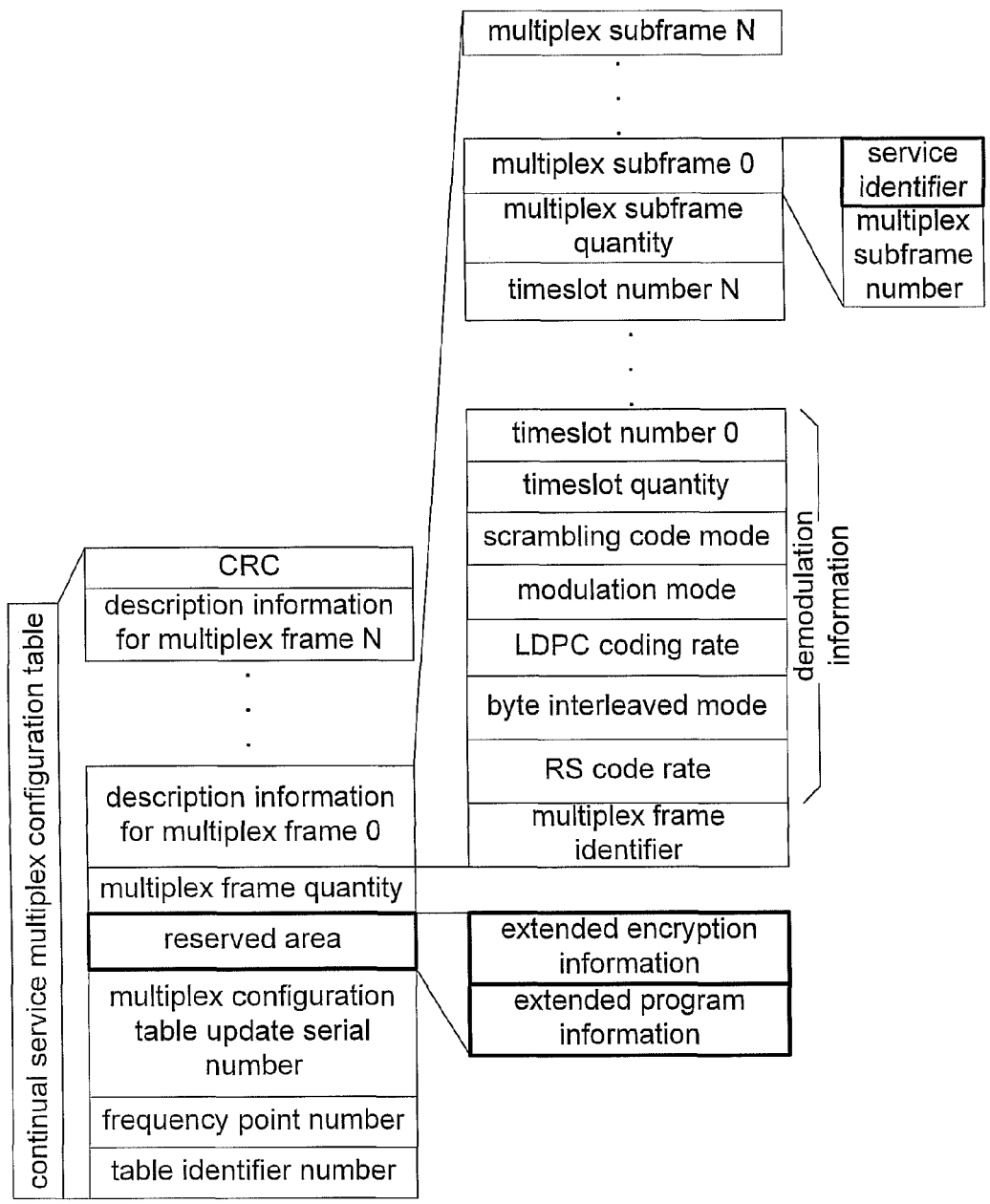
FIG. 1b is a structural schematic diagram illustrating an extension for an existing CMCT structure according to an embodiment of the present invention.

Therefore, firstly CMCT information is performed extended definition in the present invention, as shown in FIG. 1b, e.g. the information of a program information class and an encryption information class are extended in a reserved area. Thus, under the circumstance that the terminal has not received the ESG because of some reasons, the terminal can also determine whether the current service is encrypted or not and which service type it belongs to by using the CMCT information, so as to play programs or use mobile multimedia broadcasting services correctly.

Wherein, in addition to configuring the corresponding service identifiers and demodulation information (including a modulation mode, a coding rate, a scrambling code mode, a byte interleaved mode, a timeslot quantity, a timeslot number, etc.) for a program source of each service, the CMCT information is also extended to configure the program information class and the encryption information class. The program information class includes: the service type (a mobile TV program, a broadcasting program, etc.), a service name (CCTV-1, Hebei TV, etc.), a program classification (sports, entertainments, etc.) and other information. The encryption information class includes: an encryption indication (free services, paid services, etc.), a key-obtained path (the path for paying) and other information.

Although the extended program information and encryption information is within the reserved area of the CMCT as shown in FIG. 1b, this is only used to explain the extension for the CMCT information in the present invention and is not used to limit the extension area. The extended program information and encryption information may also be within other areas of the CMCT in the present invention.

With respect to the above defined extension for the CMCT information, the present invention provides a method for sending continual service multiplex configuration information, which includes:

a multiplex service server configures the service information for each service according to multimedia broadcasting data of the service, wherein the service information includes demodulation information, program information and encryption information; and the multiplex service server encapsulates the service identifier of each service and the corresponding service information into the CMCT information; wherein the program information includes the service type, the service name, a service classification and other information which is used to distinguish the type of each service; the encryption information is used to indicate whether the service data are encrypted or not and to decrypt the encrypted data; the multiplex service server sends the CMCT information to the terminal via a broadcasting network. Wherein, the multiplex service server is existing equipment, so it will not be described in details here.

The present invention also provides a method for receiving continual service multiplex configuration information corresponding to the above-mentioned sending method, which includes:

a terminal receives the CMCT information and reads the service information according to service identifiers therein, wherein the service information at least includes demodulation information, program information and encryption information; wherein the demodulation information is used for the terminal to receive the service data of each service; the program information is used to distinguish the type of each service, so that the terminal calls different service processing modules to perform processing according thereto; and the encryption information is used to indicate whether the terminal service data are encrypted or not and to decrypt the encrypted data.

Figure 2:
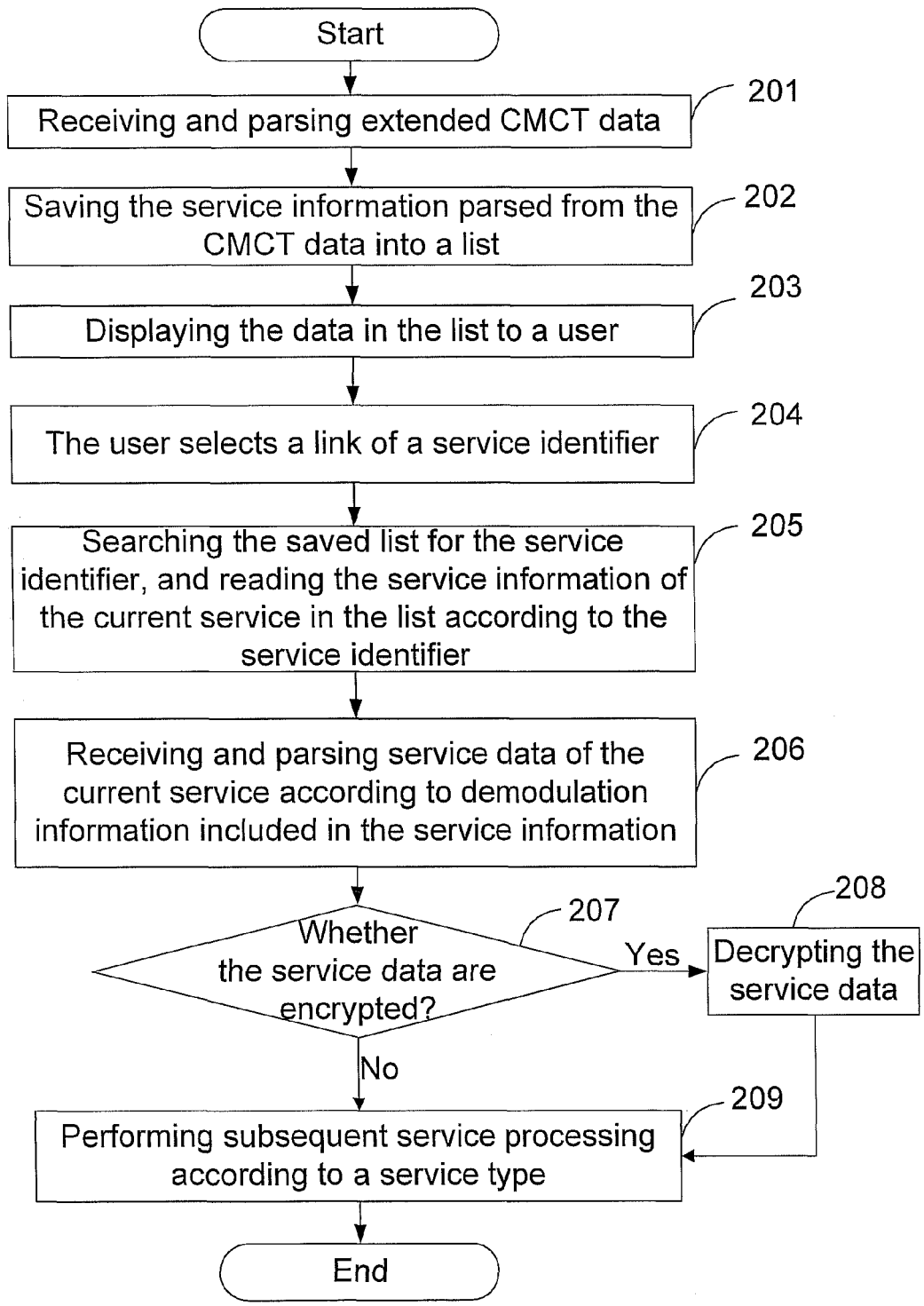
FIG. 2 is a flowchart illustrating a method for receiving continual service multiplex configuration information according to an embodiment of the present invention.

FIG. 2 is a flowchart illustrating a method for a terminal to receive continual service multiplex configuration information according to an embodiment of the present invention. The specific application of the method for transmitting the continual service multiplex configuration information in the present invention may be understood clearly according to the procedure. The procedure includes the following steps:

Step 201: the terminal receives and parses extended CMCT data, i.e. CMCT information.

In addition to the corresponding demodulation information which is configured with respect to the service identifier configured for each service into the CMCT information, the program information and the encryption information are configured for the program source by extension.

Wherein, the extended program information includes: the service type (the mobile TV program, the broadcasting program, etc.), the service name (CCTV-1, Hebei TV, etc.), the program classification (sports, entertainments, etc.) and other information. The extended encryption information includes: the encryption indication (free services, paid services, etc.), the key-obtained path (the path for paying) and other information.

Step 202: the terminal reads and parses the corresponding service information (including the demodulation information, the program information and the encryption information) according to the service identifier in the CMCT data, and saves all the service information into a list by taking the service identifiers as indexes.

Step 203: the terminal displays the data in the list to the user.

Step 204: the user selects a link of one service identifier in the data in the list.

Step 205: the terminal searches the saved list for the service identifier, and reads the corresponding service information in the list according to the service identifier.

Step 206: the terminal receives the service data of the service according to the demodulation information contained in the service information.

Step 207: determining that whether the service data are encrypted or not according to the encryption information in the service information, if yes, then executing step 208, otherwise, executing step 209.

For example, if the value of the encryption indication of the encryption information is 1, it denotes that the service data are encrypted, and if the value is 0, it denotes that the service data are not encrypted.

In fact, the terminal may also determine that the service data are encrypted only according to the key-obtained path (i.e. decryption information) contained in the encryption information.

Step 208: the service data are decrypted according to the key-obtained path, then executing the step 209.

Step 209: subsequent service processing is performed for the service data according to the service type contained in the program information, and the procedure is terminated.

Certainly, the terminal may also distinguish the service type according to the service name or the program classification information contained in the program information, so as to complete the subsequent service processing for the service data.

Figure 3:
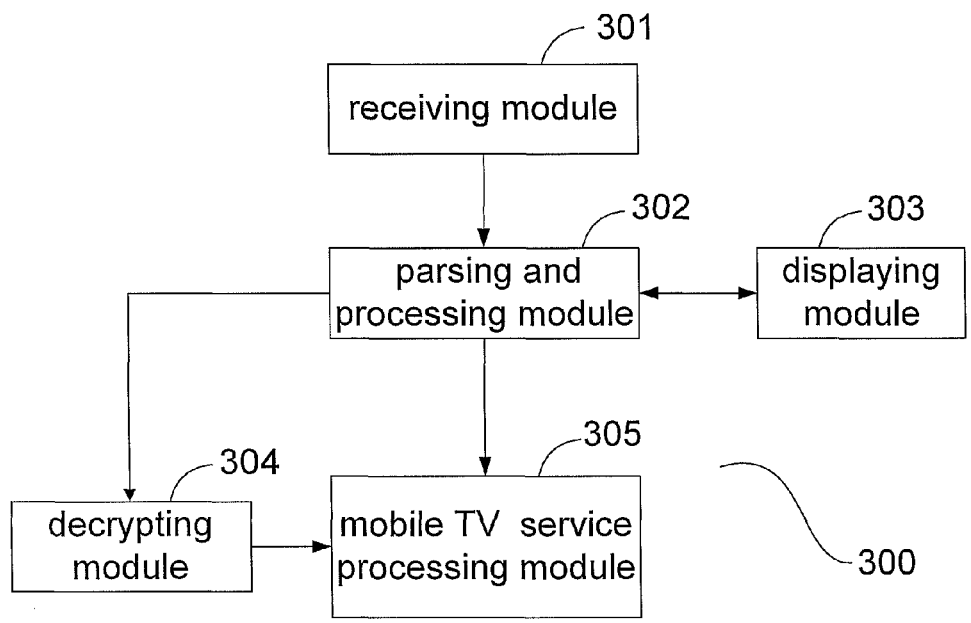
FIG. 3 is a structural schematic diagram illustrating a terminal for continual service multiplex configuration information according to an embodiment of the present invention.

A structure of a terminal for receiving continual service multiplex configuration information according to an embodiment of the present invention is shown in FIG. 3. A terminal 300 includes a receiving module 301, a parsing and processing module 302 and a displaying module 303 which are connected in turn, and further includes a decrypting module 304 and a mobile TV service processing module 305 which are connected with the parsing and processing module 302 respectively.

The receiving module 301 is used to send the CMCT data (i.e. the CMCT information) and the service data received from the broadcasting network to the parsing and processing module 302.

The parsing and processing module 302 is used to parse the received CMCT data, save the service information of each service into a list according to a service identifier of each service, and send the data in the list to the displaying module 303; and the parsing and processing module 302 is used to extract the corresponding service information from the saved list according to the service identifier received from the displaying module 303, and the parsing and processing module 302 is used to determine the service data are encrypted according to the encryption indication of the encryption information in the service information, and then to send the received service data and the encryption information to the decrypting module 304 and to send the program information to the mobile TV service processing module 305, otherwise, the parsing and processing module 302 is used to send the service data and the program information directly to the mobile TV service processing module 305 according to the service type of the program information in the service information.

The above-mentioned service information includes: the service identifier, the program information, the encryption information and the demodulation information. Wherein, the program information includes: the service type, the service name, the program classification and other information. The encryption information includes: the encryption indication, the key-obtained path and other information. The demodulation information includes: the Reed-Solomon (RS) code rate, the byte interleaved mode, coding rate of the low density parity check (LDPC) code, the modulation mode, the timeslot quantity, and the timeslot number.

The displaying module 303 is used to display the received data in the list to the user, and send the service identifier used for linking the service that is selected by the user to the parsing and processing module 302.

The decrypting module 304 is used to decrypt the service data received from the parsing and processing module 302 according to the key-obtained path information contained in the encryption information, and send the decrypted service data to the mobile TV service processing module 305.

The mobile TV service processing module 305 is used to process the service data received from the parsing and processing module 302 or to process the decrypted service data received from the decrypting module 304 according to the service type contained in the received program information, and display the processed data to the user.

Certainly, the mobile TV service processing module 305 may also distinguish the service type according to the service name or the program classification information contained in the program information, so as to complete the subsequent service processing for the service data.

Figure 4:
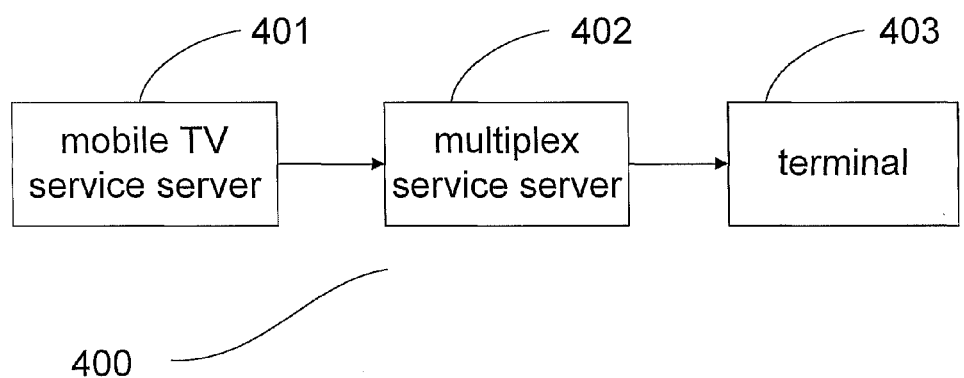
FIG. 4 is a structural schematic diagram illustrating a system for continual service multiplex configuration information according to an embodiment of the present invention.

A structure of a system for sending continual service multiplex configuration information according to an embodiment of the present invention is shown in FIG. 4. A system 400 includes a mobile TV service server 401, a multiplex service server 402 and a terminal 403 which are connected in turn. Wherein, the mobile TV service server 401 and the multiplex service server 402 construct a front end for sending the continual service multiplex configuration information.

The mobile TV service server 401 is used to send the multimedia broadcasting data of each mobile multimedia broadcasting service.

The multiplex service server 402 is used to configure the CMCT data (i.e. the CMCT information) for each mobile multimedia broadcasting service according to the received multimedia broadcasting data of each mobile multimedia broadcasting service, and send the CMCT data via the broadcasting network.

The above-mentioned CMCT data includes: the service identifier and the corresponding service information. The service information includes the demodulation information, the program information and the encryption information. Wherein, the program information includes: the service type, the service name, the program classification and other information. The encryption information includes: the encryption indication, the key-obtained path and other information.

In summary, the program information and the encryption information is extended based on the basic information in the CMCT in the present invention, so that the terminal can quickly acquire the service type and the encryption attribute of the user's current favorite service only according to the basic information of the CMCT, thus greatly reducing the user's waiting time of using the service and significantly improving the user experience. Moreover, even in the case of having not received the ESG for some reasons, the terminal can completely determine the service type and the encryption attribute of the current service by using the information in the CMCT, so as to ensure that the data of the current service are correctly processed and played for the user.

Certainly, other alternative embodiments may also be possible for the present invention, and those skilled in the art can devise various modifications and variations according to the present invention without departing from the spirit and essence of the present invention. However, those corresponding modifications and variations should all be encompassed by the protection scope of the attached claims of the present invention.

What is claimed is:

1. A method for receiving continual service multiplex configuration information, comprising the following steps performed by a terminal:
    receiving the continual service multiplex configuration information,
    reading and parsing service information according to a service identifier included in the continual service multiplex configuration information, wherein the service information includes at least demodulation information and program information;
    reading the service identifier of each service from the received continual service multiplex configuration information,
    saving the service information;
    displaying at least the program information to a user by taking the service identifier of each service as an index;
    after the user selects a service, reading the corresponding service information according to the service identifier of the selected service,
    receiving service data of the service according to the demodulation information included in the service information, and
    calling a corresponding service processing module according to the program information included in the service information, to process the service data.

2. The method according to claim 1, wherein the program information includes one or more of a service type, a service name and program classification information.

3. The method according to claim 1, wherein the service information further includes encryption information; and
    prior to processing for the service data, if the terminal determines the service data are encrypted according to the encryption information, then it decrypts the encrypted service data.

4. The method according to claim 3, wherein the encryption information includes: an encryption indication which is used to indicate whether the service data are encrypted or not, and a key path which is used to decrypt the encrypted service data; and
    if the terminal determines the service data are encrypted according to the encryption indication, then it decrypts the service data according to the key path.

5. A terminal for receiving continual service multiplex configuration information, comprising:
    a receiving circuit configured to receive the continual service multiplex configuration information from a broadcasting network and send the continual service multiplex configuration information to a processor;

the processor, configured to read and parse service information according to a service identifier included in the continual service multiplex configuration information, wherein the service information includes at least demodulation information and program information;

a display; and a mobile TV service processing circuit respectively, wherein the receiving circuit is also configured to send service data received from the broadcasting network to the processor;

the processor is also configured to save the service information and the service data in such a manner as corresponding to the service identifier of each service, and to send at least the program information of each service to the display by taking the service identifier of each service as an index; and to read the corresponding demodulation information and the program information from the saved service information after receiving a certain service identifier sent from the display, to read the corresponding service data according to the demodulation information, and to send the read service data together with the program information to the mobile TV service processing circuit;

the display is configured to display the program information to a user by taking the service identifier of each service as the index, and to send the service identifier of a service selected by the user to the processor; and the mobile TV service processing circuit is used at least to perform corresponding service processing for the service data received from the processor according to the received program information.

6. The terminal according to claim 5, wherein the program information includes one or more of a service type, a service name and program classification information.

7. The terminal according to claim 5, wherein the service information also includes encryption information; and a decrypting module is also connected between the processor and the mobile TV service processing circuit, wherein after reading the corresponding service data according to the demodulation information, the processor is also configured to determine the service data are encrypted according to the encryption information, and then to send the service data and the encryption information to the decrypting module, and to send only the program information to the mobile TV service processing circuit;

the decrypting module is configured to decrypt the service data according to the encryption information, and then to send the decrypted service data to the mobile TV service processing circuit; and the mobile TV service processing circuit is also configured to perform subsequent service processing for the decrypted service data received from the decrypting module according to the received program information.

8. The terminal according to claim 7, wherein the encryption information includes an encryption indication and a key path; wherein the processor is also configured to determine the service data are encrypted according to the encryption indication, and then to send the service data and the key path to the decrypting module; and the decrypting module is also used to decrypt the service data according to the key path, and to send the decrypted service data to the mobile TV service processing circuit.

* * * * *